March 17, 1942.  E. G. GUNN  2,276,572
METHOD OF MAKING A FILTER
Original Filed March 4, 1940  2 Sheets-Sheet 1

Inventor
Earl G. Gunn
by Charles G. Sills Attys

March 17, 1942.                E. G. GUNN                    2,276,572
                        METHOD OF MAKING A FILTER
                Original Filed March 4, 1940      2 Sheets-Sheet 2
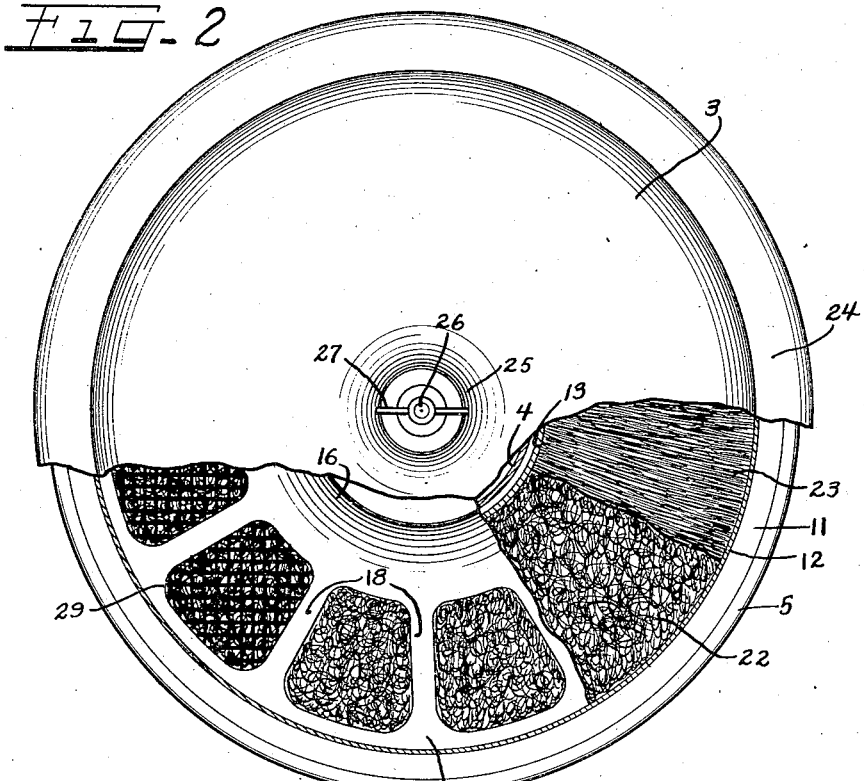
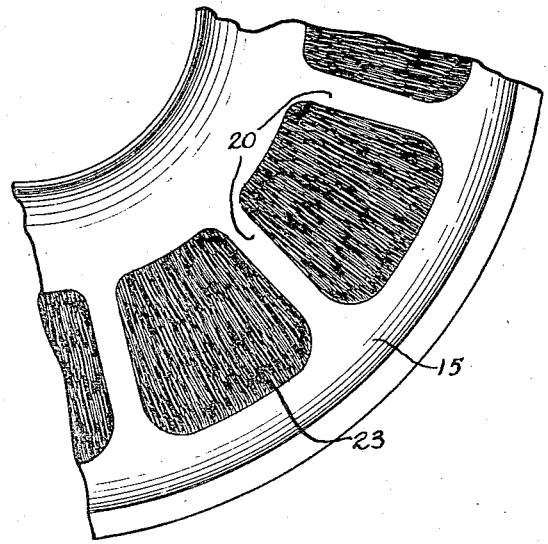
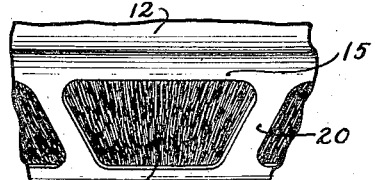
Inventor
Earl G. Gunn Patented Mar. 17, 1942

2,276,572

UNITED STATES PATENT OFFICE 2,276,572

METHOD OF MAKING FILTERS

Earl G. Gunn, Racine, Wis., assignor to Houdaille-Hershey Corporation, Detroit, Mich., a corporation of Michigan Original application March 4, 1940, Serial No. 322,142. Divided and this application May 4, 1940, Serial No. 333,303

10 Claims. (Cl. 140—71)

This invention relates to improvements in a method of making a filter, the product of the invention being highly desirable for use in connection with liquid bath air cleaners of the type used with internal combustion engines, although the product will have other uses and purposes as will be apparent to one skilled in the art.

The instant application is a division of my co-pending application entitled "Air cleaner and method of making parts thereof," filed March 4, 1940, Serial No. 322,142.

Heretofore, some difficulty has been experienced in connection with the operation of filters, especially air filters of the type used in liquid bath air cleaners wherein there is a circulation of cleansing liquid through the lower portion of the filter, in that the filter would tend to plug too rapidly and add to the restriction of the gas passing through the filter. In other words, with filters of the character heretofore known, when cleansing liquid was circulated through a portion of the filter, this cleansing liquid could not, by virtue of the construction of the filter, rapidly and easily carry off dirt removed from the gas passing through the filter. This was especially true in connection with those types of filters in which various interweavings occurred with transverse obstructions in the path of cleansing liquid draining from the filter.

With the foregoing in mind, it is an important object of this invention to provide a method of making a filter, the practice of which method results in a filter so constructed as to cause a more thorough washing of the filter element by cleansing liquid with a rapid removal of impurities removed from a traveling gas by the filter.

Another object of the invention embodies a method of making a filter, the practice of which method results in a filter mass composed of different materials, one material being easily and thoroughly cleansed by a circulating liquid, and the other portion of the mass being of a character designed to remove minute impurities and particles of entrained liquid from a gas passing through the filter.

Another important object of the invention is the provision of a new and novel method of making an air filter, the practice of which method results in a filter so arranged that the strands of the filter material are disposed in such a manner that cleansing liquid draining from the filter may freely follow the strands longitudinally thereof, without any interference from transversely disposed strands or other obstructions, thus enabling the cleansing liquid to carry impurities removed from the traveling gas by washing these impurities longitudinally along the various strands of the filter construction.

A further object of the invention resides in the provision of a method of making a filter element which includes the winding of a strand of material in the form of a coil, arranging the coil in the form of toroid, and then axially compressing the toroid in a manner to flatten the coil and arrange the individual coil portions of the strand in parallel arrangement on opposite sides of the toroid.

It is also an object of this invention to provide a method of making a filter element including the steps of utilizing a metallic wire, waved or straight, winding a coil of the wire, forming the coil into a toroid, and axially compressing the toroid to provide in effect numerous strands arranged in parallel relationship, with the inner portion of the toroid disposed lower than the outer portion of the toroid to provide the numerous paralleled strands sloping towards the center of the toroid.

Another object of the invention is the provision of a method of making a filter element including the steps of forming a filter element embodying numerous parallel strands without interfering transverse strands, and incorporating with such stranded arrangement a mass of fiber material so disposed as to remove minute foreign particles from the traveling gas after the aforesaid stranded material has removed the heavier and larger particles.

Still another object of the invention is the provision of a new and novel method of making a highly efficient filter element extremely economically.

While some of the more salient particulars and advantages of the present invention have been above pointed out, others will become apparent from the following disclosures, taken in conjunction with the accompanying drawings, in which:

Figure 2 is a reduced top plan view of the structure of Figure 1, with parts in section and parts broken away to better illustrate the construction;

Figure 3 is an enlarged fragmentary bottom plan view of the upper casing section and its contents;

Figure 4 is a fragmentary side elevational view of the upper casing section and its contents; and Figure 5 is a fragmentary plan view of a modified form of strand from which the filter element may be made.

As shown on the drawings:

Figure 1:
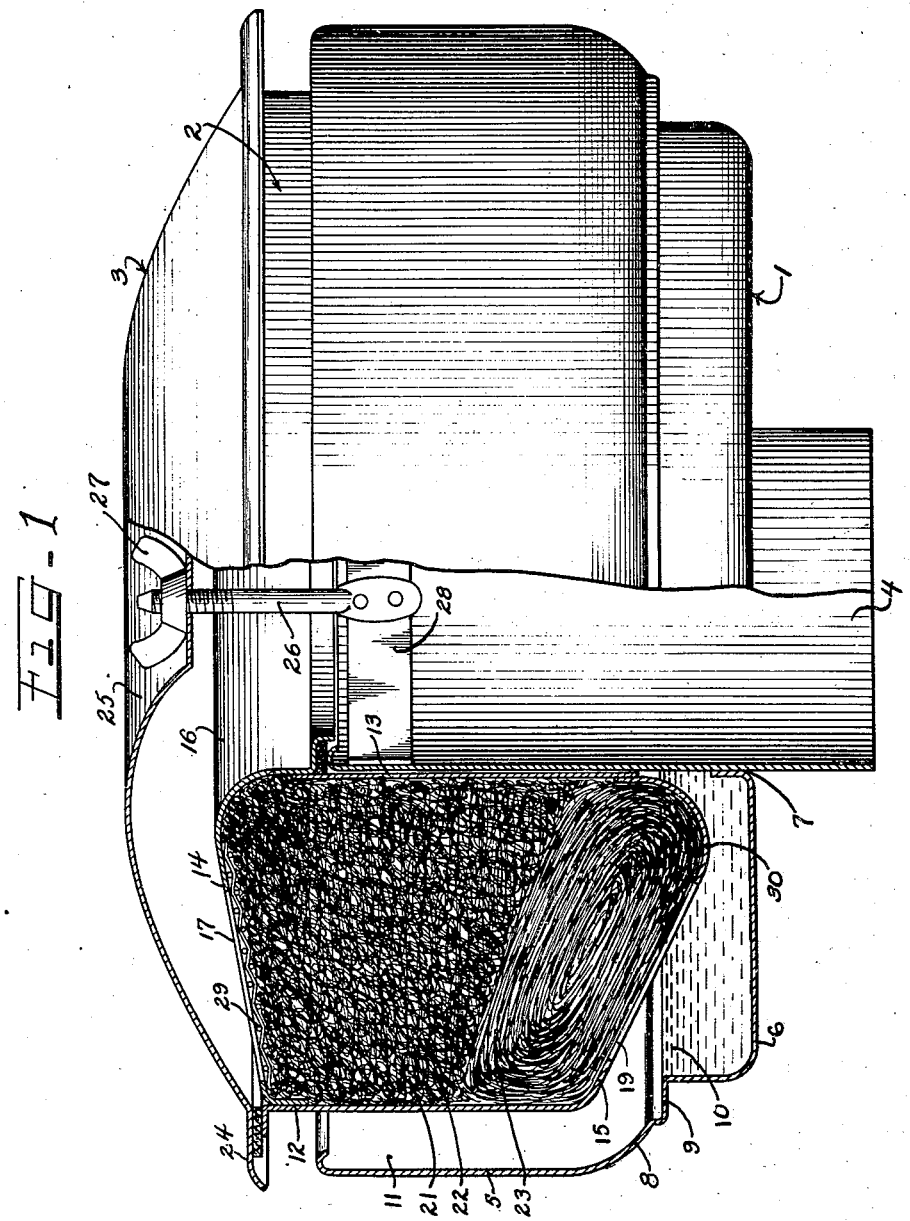
Figure 1 is a part vertical sectional and part side elevational view of an air cleaner embodying principles of the present invention.

In order to more fully present the novel method embodied in this invention and illustrate an example of use of the product resulting from practice of the method, I have illustrated and described the product of the method as embodied in an air cleaner of the liquid bath type in the manner the method was first set forth in my aforesaid co-pending application. It will, however, be clearly understood that the filter is adaptable for other and various uses within or without an air cleaner, and the method is equally as well adaptable for the ultimate provision of a filter for such other uses.

With reference more particularly to Figure 1, it will be seen that the structure selected for illustration includes a three-piece construction comprising a lower casing section 1, an upper casing section 2, and a cap or cover 3. These parts are separable, one from another, when desired.

The lower casing section includes an outlet conduit 4, centrally disposed with respect to the cleaner and by which the cleaner is attached to the intake of a carbureter or other mechanism through which clean air is to be supplied. Around this conduit 4 is a shell 5 shaped as indicated at 6 to provide a liquid sump in the lower portion thereof, and secured to the conduit 4 in the region 7, such as by welding, soldering or an equivalent method of establishing an air-tight connection. The upper portion of the shell 5 extends substantially vertically in the form of a cylinder, and immediately below this part is an arcuately inturned portion 8 to guide incoming air into the interior of the cleaner. Just below the arcuate portion 8 is a substantially horizontal, radially extending part 9, and the liquid contained in the sump, indicated by numeral 10, has a level substantially even with or slightly below the horizontal shoulder part 9. The portions 8 and 9 cooperate to guide incoming air substantially parallel with and over the surface of the sump liquid 10, rather than directly into the sump liquid so that a terrific agitation occurs, thus avoiding the expulsion of a rather large quantity of sump liquid into the filter mass immediately upon the start of operation, which is not necessary in this invention.

It will be noted that the upper casing section is of such size as to telescope with respect to the outlet conduit and the lower casing section but leave a space 11 between the outer wall 12 of the upper section and the lower section to function as an air inlet passage. This upper casing section may be made of several pieces spot-welded or otherwise secured together, including the aforesaid outer wall 12, an inner wall 13 for telescopic association with the outlet conduit 4, a top wall 14, and a bottom wall 15. The top wall 14 curves inwardly and downwardly in a relatively wide arc, as indicated at 16, to provide a non-restrictive entrance to the outlet conduit 4. This wall is also provided with numerous windows or openings 17 defined by relatively narrow radial bars 18 (Figure 2) through which air may enter beneath the cover 3 and pass through the outlet 4. The lower wall 15 is similarly provided with a plurality of windows or openings 19 defined by radial bars 20 (Figure 3).

Inside the upper casing section is a filter mass, generally indicated by the numeral 21, which may be of any desirable or suitable character but which is preferably composed of two different materials, of which the upper portion 22 is preferably of a vegetable fiber assembled in any suitable manner to establish a substantially homogeneous mass, and the lower portion 23 is a metallic stranded mass arranged in a manner to be described more fully later herein.

The top or cover 3 is generally of a dome shape with an outwardly extending hood 24 overlying the inlet passage 11, which hood carries a suitable connecting gasket resting upon a shoulder on the upper casing section, as seen in Figure 1. The central portion of the cover 3 is downwardly recessed, as indicated at 25, and centrally apertured to accommodate a bolt 26, the threaded portion of which extends upwardly through the cover and is engaged by a wing nut or equivalent means 27 within the recess 25. The lower end of the bolt 26 is rigidly secured to a cross yoke 28 extending substantially diametrically across and attached to the inside wall of the outlet conduit 4.

When the wing nut 27 is removed, the cover 3 may be lifted off the cleaner, the upper casing section 2 may be removed, leaving the lower casing section free for removal and replacement of the sump liquid 10. In assembling, it is a simple expedient to drop the upper casing section in telescopic position relatively to the lower section, place the cover on the upper section and again fasten the wing nut.

The construction and disposition of the filter mass 21 are two of the important features of my invention. As stated above, the upper portion 22 of the filter mass may be of a vegetable fiber or the equivalent, and with such material it is usually desirable to utilize a screen 29 in the nature of hardware cloth or the like to prevent the mass from creeping through the windows 17. With my novel construction of the lower portion 23 of the filter mass, no such screen is deemed necessary over the windows 19.

It will be noted that the lower wall 15 of the upper casing section slopes downwardly and inwardly away from the inlet opening 11 and terminates in a rounded portion 30 well within the sump liquid 10. The outer portion of this wall or that part nearest the inlet 11 is disposed well above the level of sump liquid. The portion 23 of the filter mass preferably fills the lower part of the upper casing section so that this part of the filter mass is at all times at least partially soaked with sump liquid, even when the cleaner is not in operation. Capillary attraction will also aid in maintaining a degree of moisture through the stranded filter portion 23 at all times, so that the cleaner is always ready for operation at a relatively high efficiency without the necessity of forcibly expelling a quantity of sump liquid into the filter mass at the start of the operation Of course, during operation, sump liquid will circulate through the filter mass or at least the lower part 23 thereof and drain back into the sump. It will be noted that the slope of the lower wall of the upper section and the stranded filter part 23 is towards that part of the liquid sump in which the liquid is least disturbed by air traveling through the cleaner. Consequently, oil may readily drain down the sloping portion of the filter, carrying with it impurities washed from the filter, and deposit these impurities in a comparatively quiescent region of the sump, where there will be little opportunity for the impurities to be disturbed and some of them possibly carried back into the filter mass by incoming air.

Maintaining the filter mass free from collected impurities obviously maintains low restriction in the cleaner, because the filter mass is prevented from being clogged, wholly or partially. Consequently, when the filter is designed for an initial high efficiency and relatively low restriction, that high efficiency will remain substantially constant, and the low restriction will remain substantially constant due to the effective and continuous cleansing of the filter mass. Therefore, a happy medium of low restriction and high efficiency is reached by the present invention.

Material aid to the rapid and effective cleansing of the lower portion 23 of the filter mass is provided in this instance by the construction of that mass portion 23. As stated above, this filter portion is preferably of metallic stranded material which may be metallic ribbon, flat wire, perfectly round wire, or the equivalent. It should be especially noted that this filter portion is constructed so that the respective wire strands in effect parallel the slope of the lower wall 15 of the upper casing section. In other words, this filter portion 23 will in effect comprise numerous metallic strands extending downwardly and inwardly away from the cleaner inlet, so that the sump liquid returning to the sump from the filter mass may follow each strand longitudinally without interference from cross strands and thus very effectively carry impurities longitudinally of the strands down into the sump. The only places where these strands deviate from their downward and inward extension is at the end portions immediately adjacent the outer wall 12 of the upper casing section and the inner wall 13, and even in these regions of lesser activity the metallic strands extend substantially vertically for easy drainage towards the sump.

This invention also includes a novel method of making the filter portion 23. A single, long metallic strand may be used and wound into a coil of the proper number of layers to occupy the lower portion of the upper casing section, depending upon the size of the casing section. The ends of the coil so wound are then brought together and interengaged to provide a coil in the nature of a toroid. The toroidal coil is then crushed to eliminate the hollow through the coil and shaped to fit the lower portion of the upper casing section, as seen in Figure 1, resulting in the arrangement of strands above described substantially paralleling each other and the slope of the lower wall of the upper casing section.

With reference to Figure 5, it will be seen that if desired a metallic wire or strand 30 may be used to form the filter portion 23. In this instance, the wire is waved in any suitable manner, such as by passing it through meshing gear teeth, but it will be noted that the waves are preferably in the nature of smooth curvatures and never reach an angle of 45 degrees relatively to the normal axis of the wire. With such construction, sump liquid may quite readily follow the longitudinally wavy contour of the wire without any material interference from cross strands when the mass is shaped as seen in Figure 1.

In operation, the present invention is extremely simple and effective. Due to suction from an internal combustion engine or whatever other equipment with which the cleaner may be associated, air is caused to forcibly enter the inlet passage 11 and pass downwardly towards the sump. The wall portions 8 and 9 guide this incoming air substantially parallel to and over the surface of the sump liquid, so that this liquid is not unduly agitated but nevertheless sufficient of the liquid will be aspirated or carried by incoming air up into the filter mass. The filter mass, due to its partial extension directly into the sump liquid, is already sufficiently wet to produce a high degree of efficiency before operation begins. The portion 23 of the filter mass removes the larger and most of the impurities from the air by virtue of its substantially complete wetting by sump liquid. Any minor impurities and entrained sump liquid will be removed from the air by the upper portion 22 of the filter mass before the clean air enters the outlet 4. In the manner above explained, the lower portion 23 of the filter mass, which is the wetter and which catches more impurities from incoming air, is thoroughly and effectively cleansed at all times by the circulation of sump liquid, and this portion of the mass is especially constructed to permit that rapid and effective cleansing which maintains low restriction in the cleaner.

From the foregoing, it is apparent that I have provided a new and novel method of formulating a filter element, which method is readily and easily, as well as highly economically, practiced, and which results in a highly efficient and durable product.

It will, of course, be understood that numerous details of the method may be varied through a wide range without departing from the principles of this invention, and it is therefore not the purpose to limit the patent granted hereon otherwise than is necessitated by the scope of the appended claims.

I claim as my invention:

1. The method of making a filter mass for use in liquid bath air cleaners, including the steps of winding a strand of material into a coil, bringing the ends of the coil together to form substantially a toroid, and then crushing the coil axially of the toroid and substantially transversely to the axis of the coil to eliminate the interior hollow of the coil and lay the respective strands forming the turns of the coil in substantially parallel arrangement.

2. The method of making a filter mass for use in liquid bath air cleaners, including the steps of winding a strand of material into a coil, bringing the ends of the coil together to form substantially a toroid, and then crushing the coil axially of the toroid and substantially transversely to the axis of the coil, and shaping the coil to have a sloping lower portion with the strands making up the coil turns running substantially straight and lengthwise of the slope.

3. The method of making a filter mass for use in liquid bath air cleaners, including the steps of winding a strand of material into a coil, bringing the ends of the coil together to form substantially a toroid, and then crushing the coil axially of the toroid and substantially transversely to the axis of the coil to eliminate the interior hollow of the coil and lay the respective strands forming the turns of the coil in substantially parallel arrangement, and assembling said crushed coil with matted fibrous material to form a composite filter mass.

4. The method of making a filter, including the steps of forming substantially a toroid of metallic wire wound in a hollow coil, and then crushing the coil substantially axially of the toroid and substantially transversely to the axis of the coil.

5. The method of making a filter, including the steps of winding a strand of material into a hollow coil, then crushing the coil in a direction substantially transversely to the axis of the coil, and shaping the crushed coil so one side is lower than the other with the coil strands on each side of the crushed coil substantially paralleling the slope.

6. The method of making a filter, including the steps of waving a strand of material with the waves at an angle of less than 90 degrees to the initial axis of the strand, winding the waved strand into a hollow coil, and crushing the coil transversely to its axis.

7. The method of making a composite filter, including the steps of forming a portion of stranded material with all strands substantially parallel, and joining said portion to another portion of matted fibrous material.

8. The method of making a composite filter, including the steps of forming a portion of metallic stranded material with all strands substantially parallel, and joining said portion to another portion of a matted vegetable fiber.

9. The method of making a filter, including the steps of winding a strand of material into a hollow coil, joining the ends of the coil to form substantially a toroid, crushing the toroid axially thereof to eliminate the hollow therein, and shaping the crushed toroid so the center portion is lower than the outer portion, and joining matted fibrous material to one side of the crushed toroid.

10. The method of making a filter element, including the steps of forming substantially a toroid having a hollow body from stranded material, and then crushing the toroid body in a direction substantially axially of the toroid and substantially transversely to the axis of the hollow body to substantially eliminate the body hollow and lay the strand portions in substantially parallel arrangement.

EARL G. GUNN.